United States Patent [19]

Teramachi

[11] 4,384,859
[45] May 24, 1983

[54] BEARING BLOCK FOR TORQUE TRANSMISSION

[76] Inventor: Hiroshi Teramachi, 34-8, Higashi-Tamagawa 2-chome, Setagaya-ku, Tokyo, Japan, 158

[21] Appl. No.: 316,997

[22] Filed: Nov. 2, 1981

[30] Foreign Application Priority Data

Dec. 29, 1980 [JP] Japan .................... 55-187821

[51] Int. Cl.³ .................... F16D 3/04; F16C 31/06
[52] U.S. Cl. .................... 464/103; 308/6 C
[58] Field of Search .......... 464/102, 103, 104, 168, 464/172; 308/6 C; 74/86

[56] References Cited

U.S. PATENT DOCUMENTS

| 1,244,533 | 10/1917 | Morse | 464/104 X |
| 2,218,580 | 10/1940 | Kennedy | 464/102 X |
| 2,892,328 | 6/1959 | Templeton | 464/104 X |
| 3,106,078 | 10/1963 | Turinsky | 464/103 |
| 3,931,720 | 1/1976 | Buhrer | 464/103 |
| 4,253,709 | 3/1981 | Teramachi | 308/6 C |
| 4,296,974 | 10/1981 | Teramachi | 308/6 C |
| 4,348,064 | 9/1982 | Teramachi | 308/6 C |

FOREIGN PATENT DOCUMENTS 161445 11/1979 Japan .................... 464/103

Primary Examiner—Stuart S. Levy
Assistant Examiner—Dao Van Huynh
Attorney, Agent, or Firm—George B. Oujevolk

[57] ABSTRACT

A new and unique bearing block for torque transmission is disclosed which comprises a bearing block body having two rectangular recesses at both the front and rear sides, said recesses extending at a right angle relative to one another and having plural substantially semi-circular ball rolling grooves on the inner wall of the recesses, a plurality of non-loading ball holes through the bearing block body, track shafts slidably inserted through the rectangular recesses with the corresponding ball rolling grooves provided on the side walls, retainers having plural slits, side covers with ball movement direction reversing U-shaped grooves and a number of balls adapted to circulate through the loading ball rolling grooves, the U-shaped grooves and the non-loading ball holes. As a typical practical application of the bearing block an improved Oldham coupling for torque transmission is disclosed according to another aspect of the present invention. This Oldham coupling is constructed such that the bearing block of the invention is operatively connected to an input shaft as well as to an output shaft. Specifically, the bottom portion of the one track shaft laterally slidably inserted through the one rectangular recess is fixedly connected to the input shaft, whereas the bottom portion of the other track shaft laterally slidably inserted through the other rectangular recess is fixedly connected to the output shaft.

7 Claims, 8 Drawing Figures

BEARING BLOCK FOR TORQUE TRANSMISSION

FIELD OF THE INVENTION

The present invention relates to a bearing block with two linear bearing shafts laterally slidably inserted through a bearing block body in the form of a rectangular parallelepiped, said linear bearing shafts extending at a right angle to one another at both the front and rear sides of the bearing block body. The characteristic features of the bearing block consist in compact structure, high rigidity and excellent accuracy in lateral sliding movement. Further, the present invention relates to an improved Oldham coupling with the bearing block as an essential component which is operatively connected to an input shaft as well as to an output shaft by way of the laterally slidable track shafts, ensuring smooth transmission of rotational torque irrespective of any off-center therebetween.

It is to be noted that the above-mentioned front side of the rectangular parallelepiped refers to the upper surface or upper part under such an operative condition that the rectangular parallelepiped is located in the horizontal posture, while the above-mentioned rear side refers to the lower surface or lower part located opposite to said upper surface or upper part of the rectangular parallelepiped.

BACKGROUND OF THE INVENTION

Heretofore, there has been known to transmission means which can carry compression load as well as tension load besides torque to be transmitted.

Further, it is known that rotational torque can be transmitted only with much difficulties, when an input shaft extends in parallel to an output shaft with an appreciable off-center therebetween. To ensure torque transmission in such a case as mentioned above, an Oldham coupling is usually employed.

The conventional Oldham coupling is constructed such that it contains an intermediate disc of which front and rear faces are formed with U-shaped grooves respectively oriented at a right angle to one another, said U-shaped grooves being adapted to come in sliding engagement with projections on both the driving and driven shafts. Thus, the result is that it is applicable only to a case where they have a very small center distance therebetween.

Further, it has been found with the conventional Oldham coupling that sliding friction increases in proportion to an increase in number of rotations of the input shaft. To obviate the above-mentioned drawback it was proposed that an Oldham coupling contains a reciprocating plain bearing disposed between an intermediate block and both the input and output shafts (c.f. Japanese Laid-Open Utility Model NO. 161,445/79).

The proposed Oldham coupling is constructed merely with a number of needle rollers as bearing means which are arranged on the retainers. Thus, the bearing means tend to fall down when the coupling is mounted in an orientation other than the vertical direction. Even when it is mounted in the vertical direction, there is a danger that the bearing means are disconnected from the intermediate block due to the centrifugal force caused by an increased number of rotations.

SUMMARY OF THE INVENTION

Thus, it is an object of the present invention to provide a bearing block which can satifactorily stand against any compression load as well as tension load by an equal extent and moreover can support any high floating load without any substantial amount of deformation.

It is other object of the present invention to provide an Oldham coupling for torque transmission containing the above bearing block as an essential component which ensures smooth torque transmission by means of loading balls and track shafts, said loading balls being adapted to circulate within the bearing block.

It is another object of the present invention to provide a bearing block which contains retainers fixedly secured to the bearing block with the aid of set screws so that the balls circulate within the bearing block without any danger of displacement of the retainers and falling-down of balls during operation.

It is further another object of the present invention to provide a bearing block which has high rigidity and long durability irrespective of any preload given thereto and moreover ensures excellent sensibility to torque to be transmitted (that is, remarkable difference in torque transmission between dynamic friction and static friction).

It is still further another object of the present invention to provide an Oldman's coupling for torque transmission with the bearing block incorporated therein, wherein the loading balls are steadily held by the retainers in the bearing block irrespective of any operative position of the input shaft as well as the output shaft in the horizontal direction, vertical direction or inclined direction and moveover rotary torque is satisfactorily transmitted from the input shaft to the output shaft without any fluctuation in angular speed.

To accomplish the above-described objects of the invention there is proposed in accordance with a bearing block for torque transmission essentially comprising a bearing block body in the form of a rectangular parallelepiped having two rectangular recesses at both the front and rear sides thereof, said recesses extending at a right angle relative to one another and having a plurality of substantially semi-circular loading ball rolling grooves on the inner wall, a plurality of non-loading ball holes located outside said loading ball rolling grooves and extending through the bearing block body in parallel to the loading ball rolling grooves and annular projections raised on both end faces of the bearing block body, track shafts laterally slidably inserted through the respective rectangular recesses, said track shafts having a plurality of loading ball rolling grooves formed on the side walls thereof, said loading ball rolling grooves being located in correspondence to said semi-circular loading ball rolling grooves in the rectangular recesses of the bearing block, retainers fixedly secured to the bottom of the rectangular recesses of the bearing block body, said retainers having a plurality of slits located in correspondence to said loading ball rolling grooves, side covers adapted to be tightly secured to both the end faces of the bearing block body, of which inside wall is formed with an annular groove in correspondence to said annular projection on the end face of the bearing block body and a plurality of radially extending ball movement direction reversing U-shaped grooves, and a number of balls arranged one after another through the longitudinally extending cylindrical hollow spaces as defined by both the loading ball rolling grooves on the rectangular recesses of the bearing block body and the loading ball rolling grooves on the side walls of the track shafts, the radially extending ball movement direction reversing grooves and the non-loading ball holes, said balls being circulated by lateral sliding movement of the respective track shafts.

Further, there is proposed according to another aspect of the present invention an Oldham's coupling for torque containing the above bearing block as an essential component therefor, wherein it is operative connected to an input shaft as well as an output shaft in such a manner that the bottom portion of a track shaft laterally slidably inserted through a rectangular recess of the bearing block body at the front side thereof is fixedly connected to the input shaft, while the bottom portion of another track shaft laterally slidably inserted through another rectangular recess of the bearing block body at the rear side thereof is fixedly connected to the output shaft.

Other objects and advantageous features of the present invention will be readily understood from the reading of the following description which has been made with reference to the accompanying drawings which illustrate a preferred embodiment of the invention.

BRIEF DESCRIPTION OF THE ACCOMPANYING DRAWINGS

DETAILED DESCRIPTION OF THE INVENTION

Now the present invention will be described in more details with reference to the accompanying drawings which illustrate an embodiment of the present invention.

Figure 3:
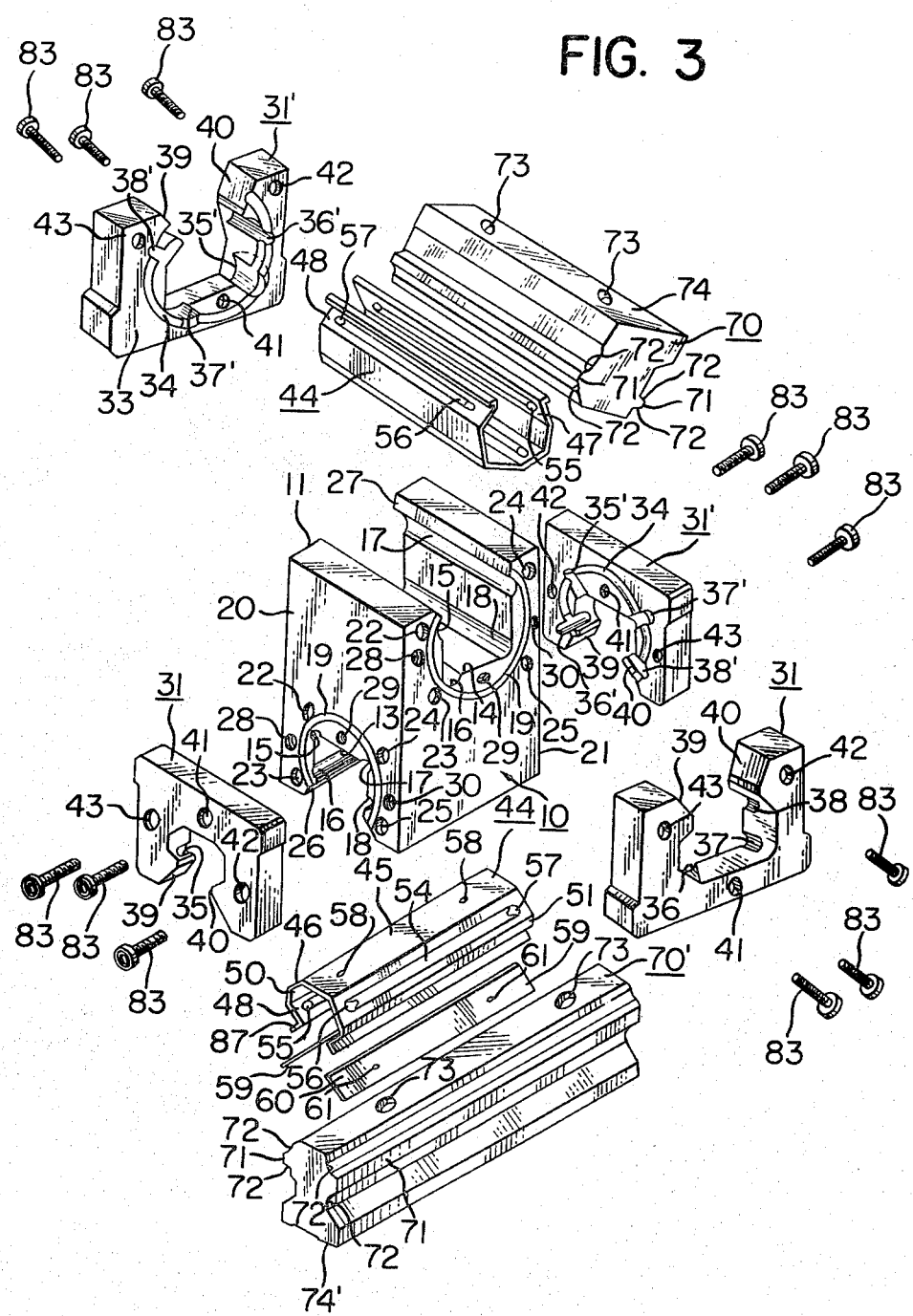
FIG. 3 is a perspective view of main components of the Oldham's coupling for equidirectional torque transmission, shown in a disassembled state.
Figure 4:
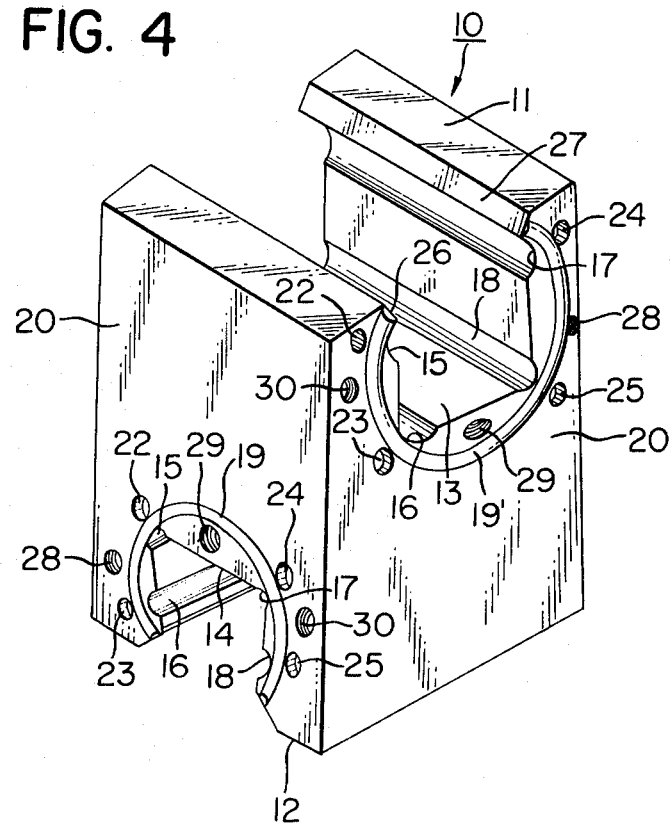
FIG. 4 is a perspective view of a bearing block body for the Oldham's coupling of the invention, shown with retainers removed therefrom.
Figure 5:
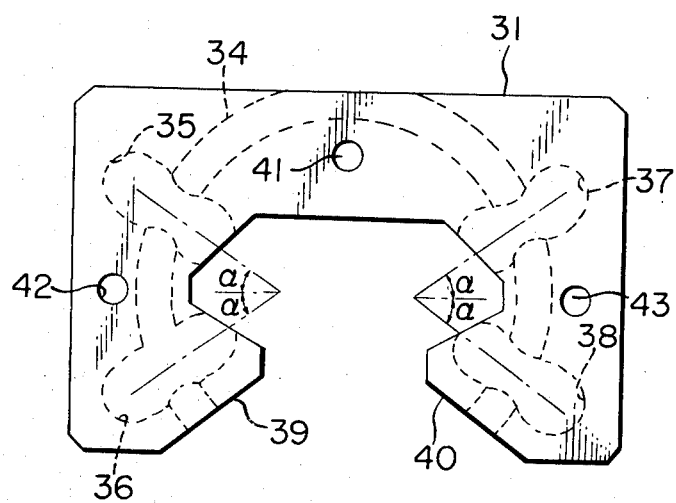
FIG. 5 is a front view of a side cover which is to be fixedly secured to an end face of the bearing block body for the Oldham's coupling of the invention.

Referring to FIGS. 3 and 4, a bearing block typically designated by reference numeral 10 is manufactured by way of the steps of machining a block steel material to the configuration of a rectangular parallelepiped having a front face 11 and a rear face 12, then machining rectangular grooves 13 and 14 which extend at a right angle relative to said front and rear faces 11 and 12 and finally machining a plurality of loading ball rolling grooves 15, 16, 17 and 18 on the inner walls of said rectangular recesses 13 and 14 in a symmetrical relation.

Further, the bearing block 10 is cut to a predetermined axial length by lathing operation and thereafter annular projections 19 and 19' are machined on both end faces for the purpose of guiding a number of balls.

Next, four non-loading ball holes 22, 23, 24 and 25 are axially drilled across the end faces 20 and 21. In this connection it is to be noted that radial lines extending through said loading ball rolling grooves 15, 16, 17 and 18 as well as said non-loading ball holes 22, 23, 24 and 25 involve an angle in the range of 35 to 45 degrees between the adjacent ones and moreover the radially innermost wall of the non-loading ball holes 22, 23, 24 and 25 is located tangent to the outer periphery of the annular ball guide projections 19 and 19'.

Then, inclined open ends 26 and 27 are formed at an inclination angle of 70 to 90 degrees along the outer edges of the respective rectangular grooves 13 and 14 of the bearing block 10 on the front and rear faces thereof.

On both the side faces 20 and 21 (front and rear faces) of the bearing block 10 are provided threaded holes 28, 29 and 30 into which tightening bolts are screwed for firmly securing side covers.

Next, reference numerals 31 and 31' designate a side cover to be firmly secured to the front and rear end faces 20 and 21 of the bearing block 10. Said side covers 31 and 31' are preferably made of die cast alloy or plastic material by die casting or injection molding process.

Figure 6:
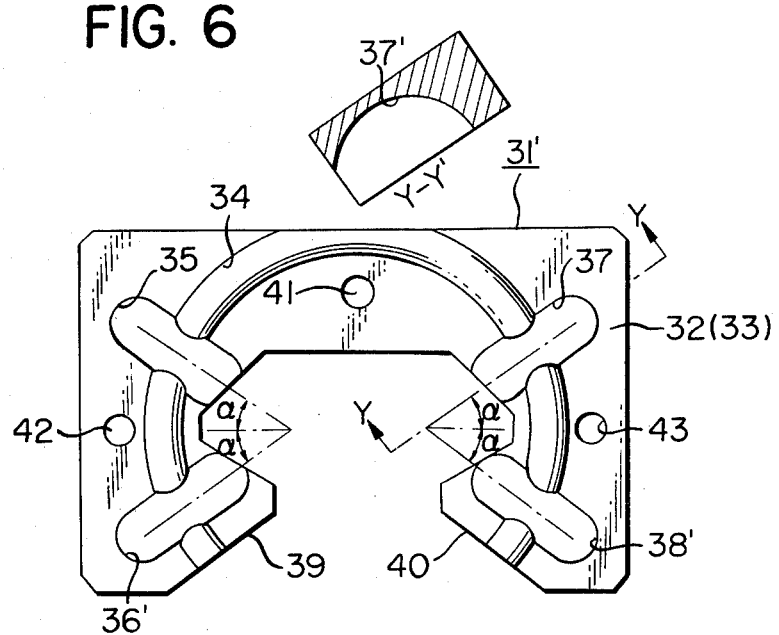
FIG. 6 is a rear view of the side cover in FIG. 5 which shows the configuration of the inside wall thereof, accompanied by a partial sectional view taken in line Y—Y.

The side covers 31 and 31' have inner faces 32 and 33 on which annular guide grooves 34 and 34' exactly corresponding to the annular ball guide projections 19 and 19' on the bearing block 10 are provided (see FIG. 6).

It is to be noted that the depth of the annular ball guide grooves 34 and 34' has the same dimension as the height of the annular ball guide projections 19 and 19'.

Next, ball movement direction reversing U-shaped grooves 35, 36, 37, 38, 35', 36', 37' and 38' are machined by milling operation using a milling cutter having the substantially same configuration as that of said U-shaped grooves 35 to 38, 35' to 38' which radially extend at the same inclination angle as that of the lines passing through the loading ball rolling grooves and the non-loading ball holes (see FIG. 6).

Then, the lower inclined open ends 39 and 40 of the side covers 31 and 31' are provided between the lower ball movement direction reversing U-shaped grooves 36 and 38 with an involving angle therebetween in the range of 70 to 90 degrees, said lower inclined open ends 39 and 40 being generally machined by milling operation.

Further, the side covers 31 and 31' have drilled holes 41, 42 and 43 through which tightening bolts 83 are inserted to firmly secure them to the front and rear faces 20 and 21 of the bearing block 10.

Reference numeral 44 designate a retainer which is shaped to a polygonal configuration by bending a steel plate, said retainer 44 having slits pressed out in the axial direction.

Figure 8:
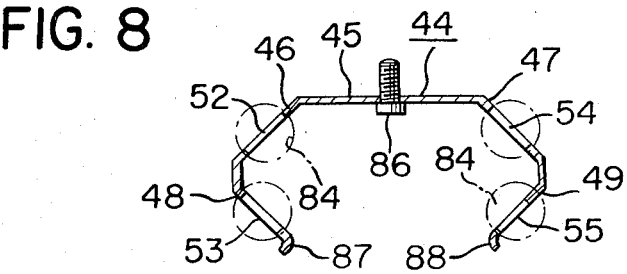
FIG. 8 is a cross-sectional view of a retainer for the Oldham's coupling of the invention.

Said retainer 44 is constructed such that the upper surface 45 of the polygonal structure extends in parallel to the plain surface of the bearing block 10, the upper inclined faces 46 and 47 as well as the lower inclined faces 48 and 49 are provided between the vertical side faces 50 and 51, the longitudinally extending slits 52, 53, 54 and 55 are formed on the inclined faces in such a manner as to prevent balls 84 from falling down therethrough and moreover the tongue pieces 56 and 57 are protruded at both ends of the respective slits (see FIGS. 3 and 8).

Reference numeral 58 designates a drilled hole on the retainer 44, through which a set screw 86 is inserted for the purpose of firmly securing the retainer 44 to the inner wall of the bearing block 10.

Reference numeral 59 designates a retainer plate made of elongated steel plate with drilled holes 61 through which set screws 85 are inserted to be screwed into the open end portions of the bearing block 10 so that the lower ends 87 and 88 are depressed by a part of said retainer plate 59.

Reference numeral 70 designates a track shaft which has raised portions 71 extending in the longitudinal direction on both sides thereof. Above and below said raised portions 71 are provided semi-circular grooves 72 which serve as a loading ball rolling groove, whereas at the front and rear parts of the track shaft 70 are provided drilled holes 73 which are located on the central line thereof.

Figure 1:
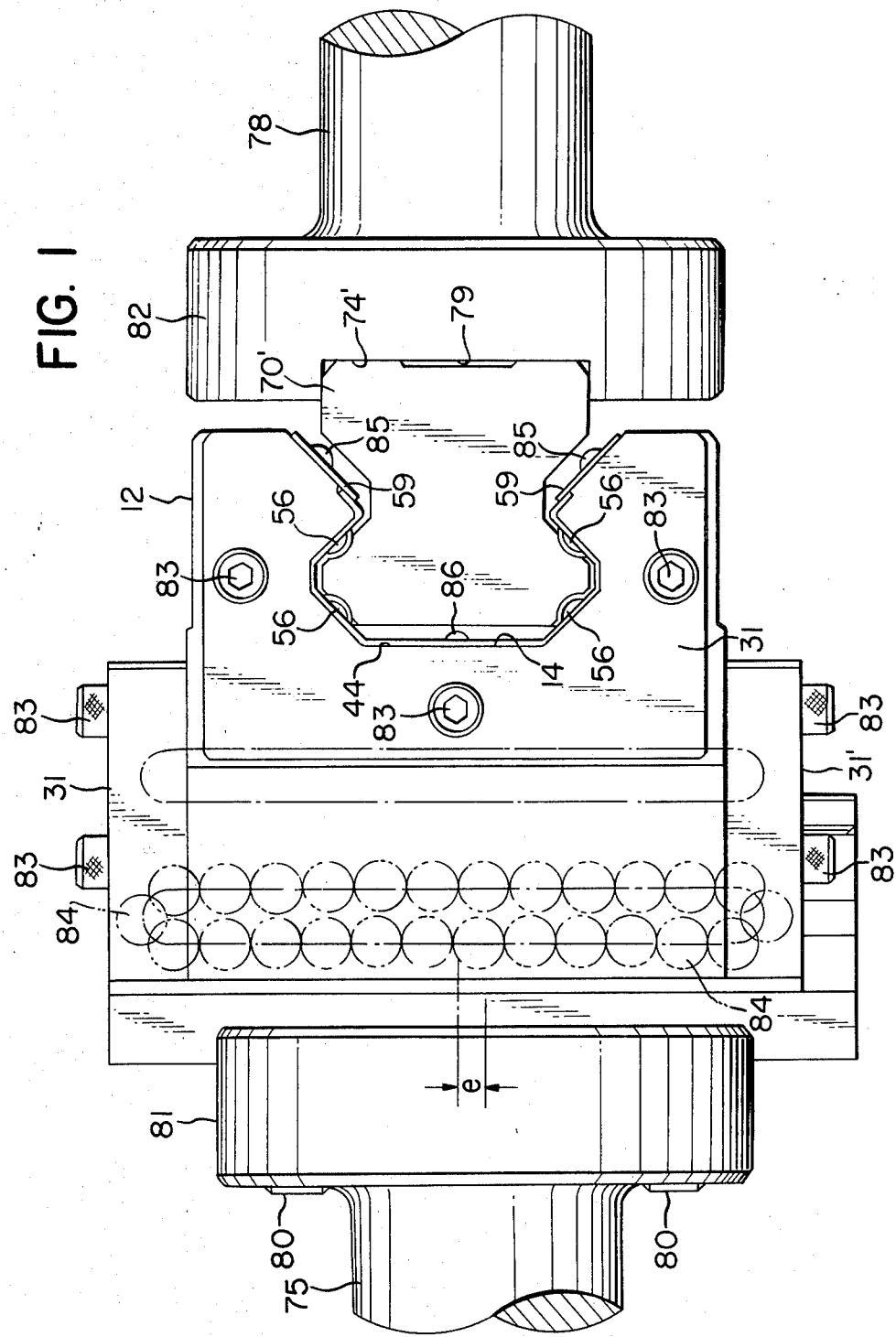
FIG. 1 is a plan view of an Oldham coupling for equidirectional torque transmission in accordance with the present invention.
Figure 2:
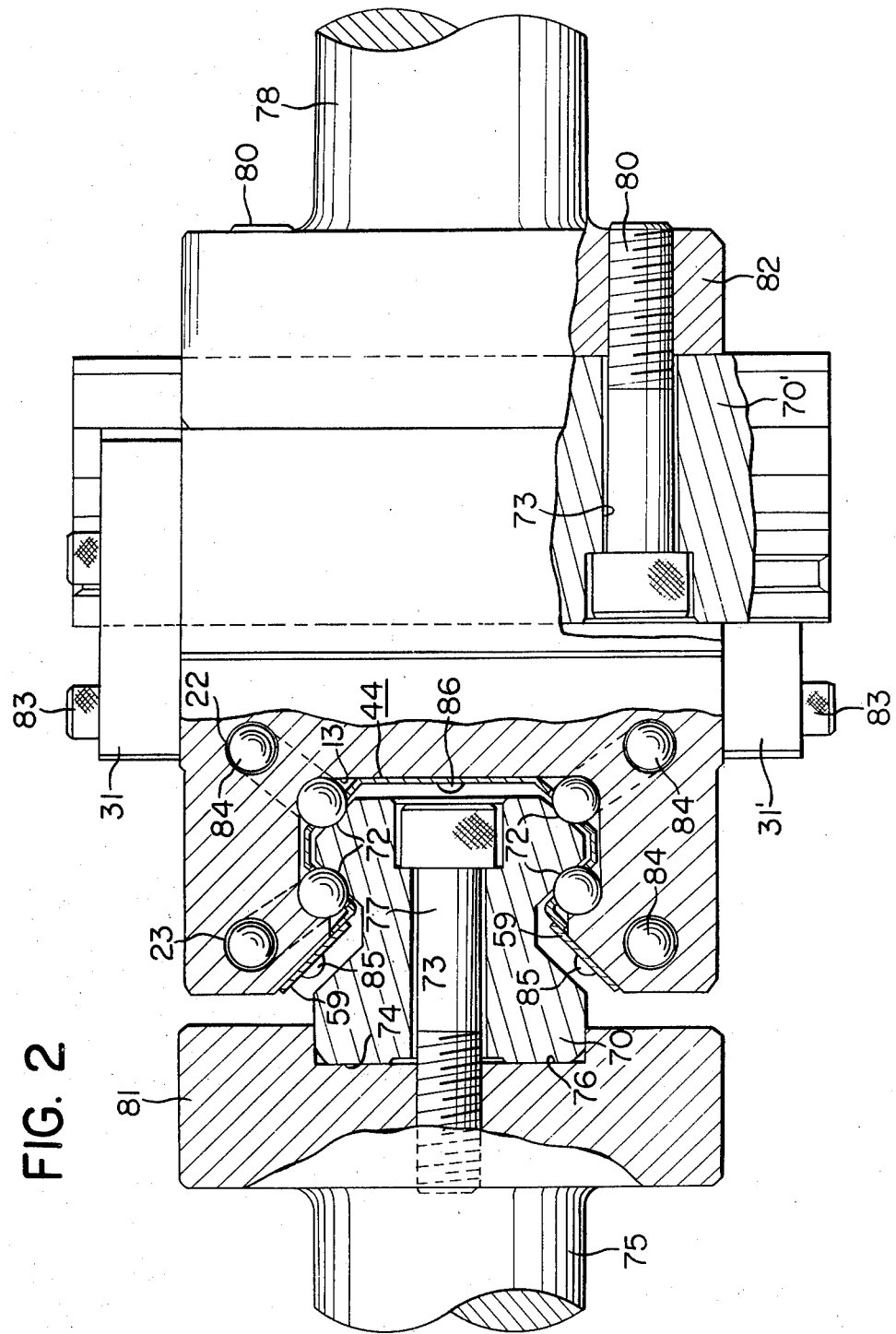
FIG. 2 is a partially sectioned plan view of the Oldham's coupling for equidirectional torque transmission in FIG. 1.

As illustrated in FIG. 2, the bottom portion 74 of the track shaft 70 is fitted into the recessed part 76 of the flange 81 of the input shaft 75 and then is tightly fixed to the latter by means of bolts 77 which are inserted through the drilled holes 73.

On the other hand, the bottom portion 74' of the track shaft 70' is fitted into the recessed part 79 of the flange 82 of the output shaft 78 and then is tightly fixed to the latter by means of bolts 80 in the same manner as in the foregoing.

The components constituting the bearing block for torque transmission in accordance with the present invention is designed and constructed in the above-described manner. Now their assembling will be described in a greater detail as follows.

First, the retainer 44 is inserted in the bearing block 10 and then is firmly secured to the bottom wall of the bearing block 10 at both the front and rear sides thereof by tightening the set screws 86 which are inserted through the drilled holes 58 of the retainer 44.

Further, the retainer 44 is additionally held onto the bearing block 10 by depressing the end portions 87 and 88 of the retainer 44 with the aid of the retainer plates 58.

On the other hand, the one side cover 31 is secured to the end face of the bearing block 10 by means of the set screws 83.

Next, the predetermined number of balls 84 are successively inserted through the non-loading ball holes 22, 23, 24 and 25 one after another and then after completion of charging with the balls the other side cover 31' is fixed. Thus, the assembly of the bearing block is completed.

Owing to the facts that the loading balls displaceably held in the longitudinally extending cylindrical hollow spaces defined by the loading ball rolling grooves on the bearing block 10 and the track shafts 70 and 70' inserted therethrough have sufficient capability to stand against compression load as well as tension load, they have excellent sliding movability at high accuracy, the respective track shafts inserted through the bearing block have four loading ball rolling grooves in a symmetrical relation and moreover the loading balls are held at a contact angle of 45 degrees relative to the horizontal axis, the result is that the bearing block of the invention has an equidirectional load carrying capability.

Next, when the bearing block as constructed in the above-described manner is put in practical use, the bottom portion 74 of the track shaft 70 is fitted into the recess 76 of the flange 81 of the input shaft 75 and then they are tightly connected one another by means of two bolts 77 which are inserted from track shaft side.

Further, the bottom portion 74' of the track shaft 70' is fitted into the recess 79 of the flange 82 of the output shaft 78 and then they are tightly connected one another by means of two bolts 80 which are bolted from the track shaft side in the same manner as in the foregoing.

Then, the assembled track shaft of the input shaft 75 is fitted into the front part 11 of the bearing block, while the other assembled track shaft 70' of the output shaft 78 is fitted into the rear part 12 of the same. Thus, the whole intended assembling operations are completed.

Now transmission of rotary torque from the input shaft to the output shaft via the bearing block will be described below.

As rotational torque is transmitted from the input shaft 75 to the bearing block 10 by way of the track shaft 70 tightly secured to the flange 81 of the input shaft 75, the bearing block 10 effects lateral sliding movement relative to the track shaft 70 at the input shaft side as well as the track shaft 70' at the output shaft 70' so as to compensate an off-center therebetween, whereby rotational torque is satisfactorily transmitted to the output shaft 78.

Specifically, as the input shaft 75 rotates, the front part 11 of the bearing block 10 is rotated while laterally sliding along the side walls of the track shaft 70 with the aid of the loading balls 84 contained in the longitudinally extending cylindrical hollow spaces defined by the loading ball rolling guide grooves in the rectangular recess 13, whereas the rear part 12 of the bearing block 10 is rotated at the same time while laterally sliding along the side walls of the track shaft 70' with the aid of the loading balls 84 in the rectangular recess 14. Thus, rotational torque is transmitted to the output shaft 78.

Figure 7:
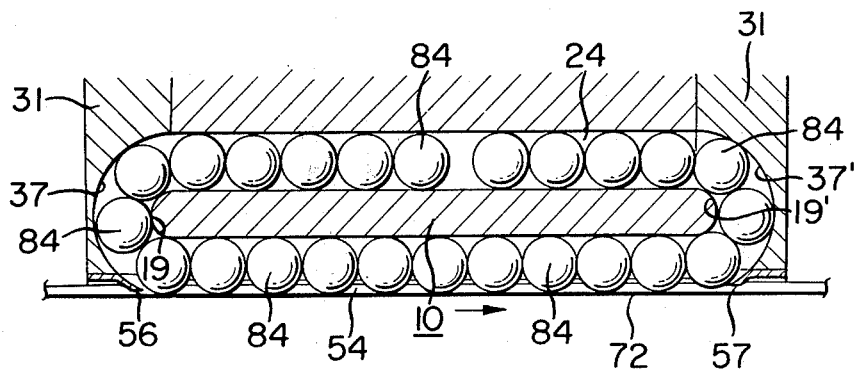
FIG. 7 is a partial sectional view of a bearing block for the Oldham's coupling of the invention which illustrates a circulation of balls therethrough, shown in an enlarged scale.

As the front and rear parts 11 and 12 of the bearing block laterally slide along the side walls of the track shafts 70 and 70' together with the balls 84 held in the rectangular recesses 13 and 14, the balls 84 contained in the longitudinally extending cylindrical hollow spaces defined by the semi-circular grooves 72 of the respective track shafts 70 and 70' as well as the loading ball rolling guide grooves 15 to 18 effect rolling while being guided along the slits 52 to 55 of the retainer 44 which serves to hold the balls 84, then are scooped up by means of the tongue piece 56 or 57 at both the ends of the respective slits 52 to 55 to be displaced in the ball movement direction reversing U-shaped grooves 37' on the side cover 31', and thereafter move through the non-loading ball holes 24 in the bearing block 10 (see FIG. 7).

Since the bearing block 10 and the track shafts are brought in operative contact at a contact angle of 45 degrees with the balls 84 arranged one after another in four grooves 72, it is ensured that the bearing block of the invention has an equidirectional load carrying capability (see FIG. 2).

As an alternative application of the bearing block the upper track shaft 70 serves as a robot finger at its one end, said upper track shaft 70 being fitted through the bearing block 10 which in turn has the lower track shaft 70' fitted therethrough.

When the bearing block of the invention is applied to an Oldham coupling, rotational torque is transmitted from the input shaft to the output shaft with no relative angle therebetween changed irrespective of any arrangement that the input shaft and the output shaft are rotationally supported in the horizontal direction or in the vertical direction or in any inclined direction, wherein the balls held by the retainer in the bearing block contribute to torque transmission as described above.

It is to be noted that since the retainer is firmly mounted in the bearing block in such a manner as to ensure endless circulation of balls there is no fear of dislocation of the retainer and falling-down of the balls.

The bearing block of the invention has advantageous features that preload may be given without any possibility of irregular or wrong movement of the associated components, and thereby increased rigidity is achieved, resulting in elongated running life and excellent response to torque to be transmitted (that is, remarkably high difference between static friction and dynamic friction).

It should be of cource understood that the present invention should be not limited only to the arrangement that the retainer as well as the retainer plate are firmly mounted on the bearing block by means of set screws and other suitable mounting means such as adhesive agent having an excellent adhesive power may be in use.

What is claimed is:

1. A bearing block for torque transmission essentially comprising a bearing block body in the form of a rectangular parallelepiped having two rectangular recesses formed at both the front and rear sides thereof, said one rectangular recess at the front side extending at a right angle relative to said other rectangular recess at the rear side, said respective rectangular recesses having a plurality of substantially semi-circular loading ball rolling grooves at the inner wall, a plurality of non-loading ball holes located outside said loading ball rolling grooves and extending through the bearing block body in parallel to the loading ball rolling grooves and annular ball guide projections provided on both end faces of the bearing block body, track shafts slidably inserted through the respective rectangular recesses, said track shafts having a plurality of loading ball rolling grooves formed on the side walls thereof, said loading ball rolling grooves being located in correspondence to said semi-circular loading ball rolling grooves in the rectangular recesses of the bearing block body, retainers fixedly secured to the bottom of the rectangular recesses of the bearing block body, said retainer having a plurality of slits located in correspondence to said loading ball rolling grooves, side covers adapted to be tightly secured to both of the end faces of the bearing block body, of which inside wall is formed with an annular groove in correspondence to said annular projection on the end face of the bearing block body and a plurality of radially extending ball movement direction reversing U-shaped grooves, and a number of balls arranged one after another through the longitudinally extending cylindrical hollow spaces as defined by both the loading ball rolling grooves on the rectangular recess of the bearing block body and the loading ball rolling grooves on the side walls of the track shafts, the radially extending ball movement direction reversing U-shaped grooves and the non-loading ball holes, said balls being circulated by lateral sliding movement of the respective track shafts.

2. A bearing block for torque transmission as defined in claim 1, wherein four loading ball rolling grooves are provided in a symmetrical relation.

3. A bearing block for torque transmission as defined in claim 1, wherein the side covers are made of die casting alloy or plastic material.

4. A bearing block for torque transmission as defined in claim 1, wherein the slits of the respective retainers have a width appreciably smaller than the diameter of the balls and tongue pieces are provided at both the ends of the respective slits.

5. A bearing block for torque transmission as defined in claim 1, wherein the annular projections on the end faces of the bearing block body have the substantially same radius as that of the radially extending ball movement direction reversing U-shaped grooves on the side covers.

6. An Oldham coupling for torque transmission containing a bearing block as an essential component therefor, said bearing block being operatively connected to an input shaft as well as to an output shaft in such a manner that the bottom portion of a track shaft slidably inserted through a rectangular recess of the bearing block at the front side is fixedly connected to the input shaft, while the bottom portion of another track shaft slidably inserted through another rectangular recess of the bearing block at the rear side thereof is fixedly connected to the output shaft, wherein the bearing block essentially comprises a bearing block body in the form of a rectangular parallelepiped having two rectangular recesses formed at both the front and rear sides thereof, said one rectangular recess at the front side extending at a right angle relative to said other rectangular reces at the rear side, said respective rectangular recesses having a plurality of substantially semi-circular loading ball rolling grooves at the inner wall, a plurality of non-loading ball holes located outside said loading ball rolling grooves and extending through the bearing block body in parallel to the loading ball rolling grooves and annular ball guide projections provided on both end faces of the bearing block body, track shafts adapted to be slidably inserted through the respective rectangular recesses, said track shafts having a plurality of loading ball rolling grooves formed on the side walls thereof, said loading ball rolling grooves being located in correspondence to said semi-circular loading ball rolling grooves in the rectangular recesses of the bearing block body, retainers fixedly secured to the bottom of the rectangular recesses of the bearing block body, said retainers having a plurality of slits located in correspondence to said loading ball rolling grooves, side covers adapted to be tightly secured to both the end faces of the bearing block body, of which inside wall is formed with an annular groove in correspondence to said annular projections on the end faces of the bearing block body and a plurality of radially extending ball movement direction reversing U-shaped grooves, and a number of balls movably arranged one after another through the longitudinally extending cylindrical hollow spaces as defined by both the loading ball rolling grooves on the rectangular recess of the bearing block body and the loading ball rolling grooves on the side walls of the track rails, the radially extending ball movement direction reversing U-shaped grooves and the non-loading ball holes, said balls being circulated by lateral sliding movement of the respective track shafts.

7. An Oldham coupling for torque transmission as defined in claim 6, wherein the track shaft is fitted into a recess of a flange portion of the input shaft or the output shaft and is fixedly connected to the latter by means of bolts.

* * * * *

REEXAMINATION CERTIFICATE (2200th)
United States Patent [19]

Teramachi

[11] B1 4,384,859

[45] Certificate Issued  Jan. 25, 1994

[54] BEARING BLOCK FOR TORQUE TRANSMISSION

[76] Inventor: Hiroshi Teramachi, 34-8, Higashi-Tamagawa 2-chome, Setagaya-ku, Tokyo, Japan

Reexamination Request:
No. 90/002,825, Aug. 27, 1992

Reexamination Certificate for:
Patent No.: 4,384,859
Issued: Nov. 2, 1981
Appl. No.: 316,997
Filed: May 24, 1983

[51] Int. Cl.$^5$ .......................... F16D 3/04; F16C 31/06
[52] U.S. Cl. .......................... 464/103; 384/45
[58] Field of Search .................. 464/102–104; 384/43–45

[56] References Cited

U.S. PATENT DOCUMENTS

| | | | |
|---|---|---|---|
| 19,887 | 4/1858 | Wilmarth et al. | 464/104 |
| 1,244,533 | 10/1917 | Morse | 464/104 X |
| 1,648,078 | 11/1927 | Thomsen | 464/103 |
| 2,218,580 | 10/1940 | Kennedy | 464/102 X |
| 2,892,328 | 6/1959 | Templeton | 464/104 X |
| 3,106,078 | 10/1963 | Turinsky | 464/103 |
| 3,897,982 | 8/1975 | Teramachi | 384/45 |
| 3,931,720 | 1/1976 | Bührer | 464/103 |
| 4,253,709 | 3/1981 | Teramachi . | |
| 4,296,974 | 10/1981 | Teramachi . | |
| 4,348,064 | 9/1982 | Teramachi . | |

FOREIGN PATENT DOCUMENTS 50-113747  9/1975  Japan .
53-61553   5/1978  Japan .
55-72912   6/1980  Japan .

*Primary Examiner*—Daniel P. Stodola

[57] ABSTRACT

A new and unique bearing block for torque transmission is disclosed which comprises a bearing block body having two rectangular recesses at both the front and rear sides, said recesses extending at a right angle relative to one another and having plural substantially semi-circular ball rolling grooves on the inner wall of the recesses, a plurality of non-loading ball holes through the bearing block body, track shafts slidably inserted through the rectangular recesses with the corresponding ball rolling grooves provided on the side walls, retainers having plural slits, side covers with ball movement direction reversing U-shaped grooves and a number of balls adapted to circulate through the loading ball rolling grooves, the U-shaped grooves and the non-loading ball holes. As a typical practical application of the bearing block an improved Oldham coupling for torque transmission is disclosed according to another aspect of the present invention. This Oldham coupling is constructed such that the bearing block of the invention is operatively connected to an input shaft as well as to an output shaft. Specifically, the bottom portion of the one track shaft laterally slidably inserted through the one rectangular recess is fixedly connected to the input shaft, whereas the bottom portion of the other track shaft laterally slidably inserted through the other rectangular recess is fixedly connected to the output shaft.

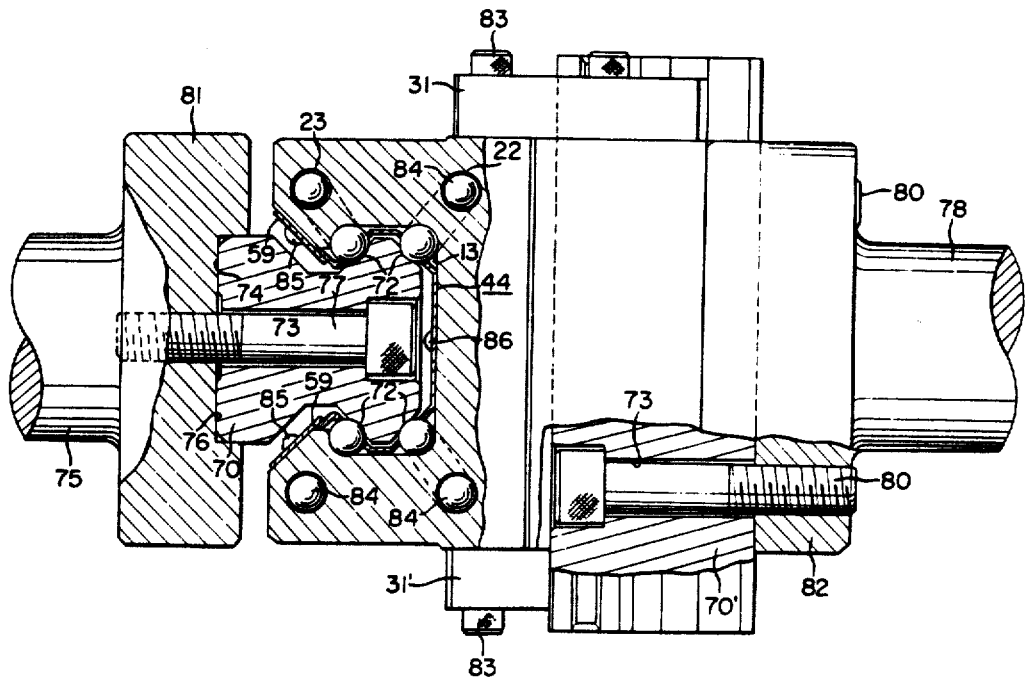

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-7 are cancelled.

* * * * *